Patented Nov. 25, 1930

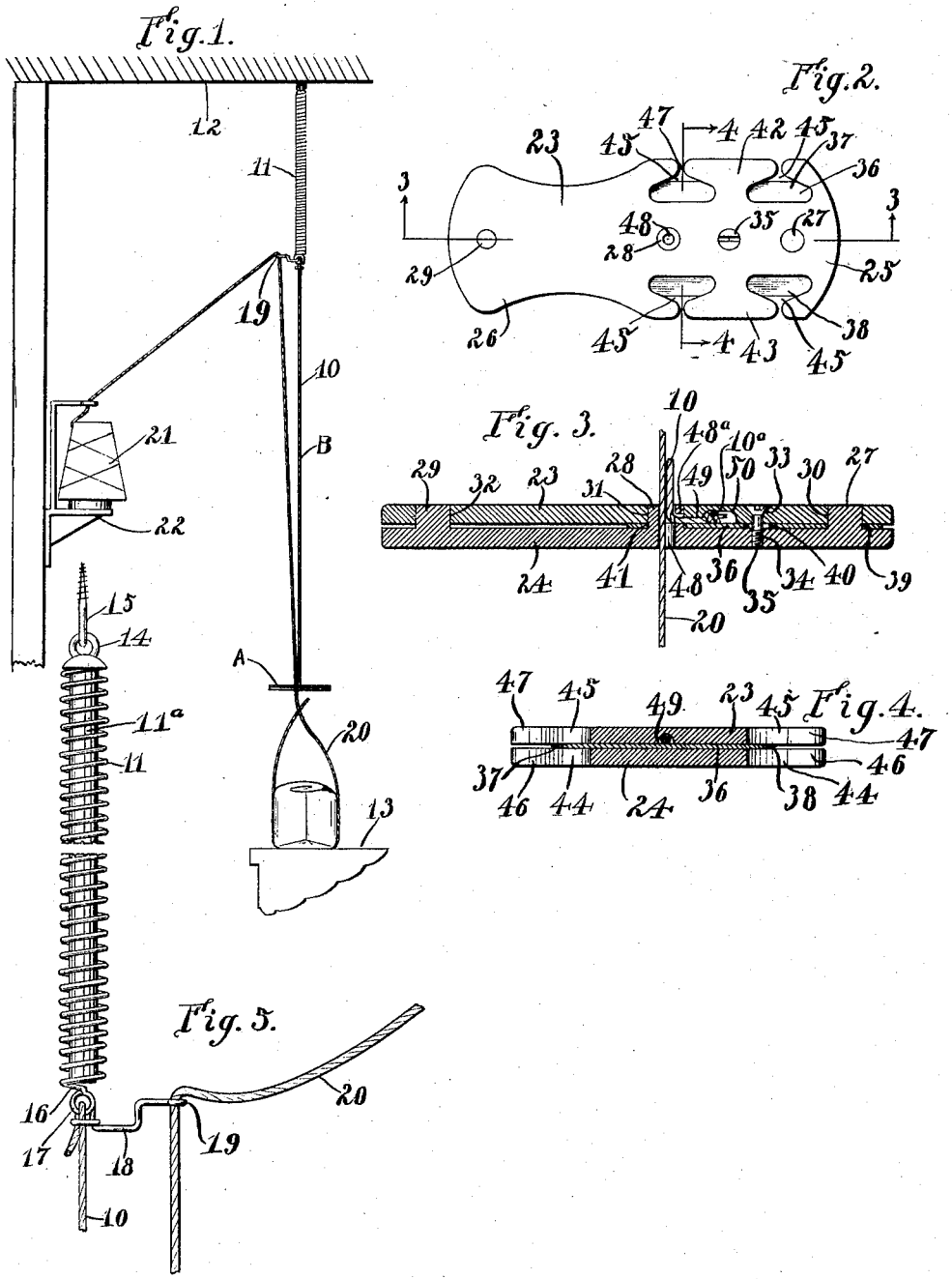

1,782,971

UNITED STATES PATENT OFFICE

JOSEPH E. KROEMER, OF ST. PAUL, MINNESOTA

TWINE DISPENSING AND CUTTING DEVICE

Application filed April 2, 1928. Serial No. 266,860.

My invention relates to twine dispensing and cutting devices and has for its object to provide a device by means of which twine may be conveniently and rapidly supplied for the purpose of wrapping bundles and for similar uses.

Another object of the invention resides in providing a cutter with an extensible hanger therefor, whereby said cutter may be suspended in a convenient position permitting the twine used to be severed close to the bundle, thus eliminating waste of twine and enhancing the appearance of the bundle.

Another object of the invention resides in employing in the hanger a resilient member for supporting the cutter and for feeding the twine, said member consisting of a coil spring suspended at its upper end above the working surface where the twine is to be utilized and having an eye at its lower end through which the twine to be consumed is guided.

A feature of the invention resides in supplying in said hanger a cord which is hung from the resilient member and attached at its lower end to the cutter proper substantially at its center of gravity, said cutter having an eye for guiding the twine from said resilient member to the working surface.

Another object of the invention resides in providing a rod within the spring adapted to check the rebound of the spring.

A still further object resides in constructing said cutter with a pair of complemental plates, one of said plates being formed with lugs thereon adapted to engage companion openings formed in the other of said plates for holding the same in registry.

A feature of the invention resides in providing a blade having cutting edges and formed with openings between the cutting edges adapted to receive certain of the lugs of the cutter plate for holding the cutting blade firmly disposed between the cutter plates with the cutting edges of the blade confined within the margins of said plates.

A still further object of the invention resides in forming openings along the margins of said plates adapted to expose portions of the cutting edges of the blade and further to provide slots extending through the margins of the plates and communicating with said openings to permit of the insertion of twine into said openings for engagement with the cutting edges of the blade.

With the foregoing and other objects in view, which will appear in the following description, the invention resides in the novel combination and arrangement of parts and in the details of construction hereinafter described and claimed.

In the drawings:

Fig. 1 is an elevational view showing an embodiment of my invention and illustrating the manner in which it is used.

Fig. 2 is a plan view illustrating the cutter in detail.

Fig. 3 is an enlarged sectional view taken on line 3—3 of Fig. 2.

Fig. 4 is an enlarged sectional view taken on line 4—4 of Fig. 2.

Fig. 5 is a detail view of the resilient member shown in Fig. 1 and drawn to a larger scale.

In the wrapping of bundles in the ordinary manner with twine, considerable time is lost and twine wasted in severing the twine at the bundle. Where a cutter is employed, further time is lost in securing the cutter and bringing the same into cutting position. My invention provides a simple and effective device, whereby the free end of the twine and the cutter are always situated in juxtaposition so that the user may quickly grasp the twine and, after tying a bundle, may have his hand guided to the cutter by the twine, the cutter providing for the quick severance of the twine close to the knot formed in the tying of the bundle.

My improved device is shown in its entirety in Fig. 1, the same including a cutter A supported near its center of gravity by a hanger B. This hanger includes a cord 10 which is attached at its lower end to the cutter A and at its upper end to the lower end of a coil spring 11 depending from the ceiling 12 or other suitable support above the working surface such, for example, as the working surface of a counter 13. The twine 20 is guided along the hanger B passing directly through the cutter A. This twine is preferably drawn from a ball or reel 21 supported upon a suitable support 22 mounted in proximity to the hanger B.

The coil spring 11 is formed at its upper end with an eye 14 which has attached to it a suitable screw eye 15 adapted to be screwed into the ceiling 12 or other structure from which the device is to be suspended. The end of the spring 11 at the bottom thereof is bent first to form a radial portion 16, then to form an eye 17 to which the cord 10 may be attached and finally to form an offset portion 18 which terminates in a second eye 19 through which the twine 20 is passed from the ball 21. Within the coil spring 11 is disposed a rod 11$^a$ which may be secured at its upper end to the upper end of spring 11, or which may be loose within the spring. This rod is slightly longer than the length of the spring normally retracted and is adapted to be engaged by the eye 14 at one end and the portion 16 of said spring at its other end. When the spring 11 is suddenly released from extended position said rod comes into operation to check the rebound of the spring. This action of the rod, prevents the whipping of the spring with the result that the cutter A quickly comes to rest.

The cutter A, shown in detail in Figs. 2, 3 and 4, comprises two plate-like members 23 and 24 which are preferably shaped as illustrated in Fig. 2, being formed at one end with relatively enlarged portions 25 and at their other ends with portions 26 forming a handle by means of which the cutter may be conveniently manipulated. The enlarged end 25 of the plate 24 is provided with two lugs 27 and 28 while the handle portion 26 is formed with a similar lug 29, all of which protrude beyond the inner surface of said plate. Plate 23 is formed with openings 30, 31 and 32 which respectively receive lugs 27, 28 and 29 and hold the two plates in register. Further, the two plates are formed with registering openings 33 and 34, the latter being threaded. These openings are adapted to receive a small screw 35 by means of which the two plates may be firmly clamped together. Between the two plates 23 and 24 is positioned a suitable blade 36 having two oppositely facing cutting edges 37 and 38. This blade is constructed with three holes 39, 40 and 41 which correspond with the holes 30, 33 and 31 of plate 23 and which permit of the insertion therethrough of the lugs 27 and 28 and the bolt 35 so that said cutting blade may be immovably disposed between the two plates 23 and 24 and rigidly clamped in position by means of the bolt 35.

It will be noted that the enlarged portions 25 of the plates 23 and 24 are so proportioned that the cutting edges 37 and 38 of the blade 36 lie well within the marginal portions 42 and 43 of said plates. Adjacent the margins 42 and 43 of plates 23 and 24 are formed registering openings 44 and 45 which serve to expose portions of the cutting edges 37 and 38 of the blade 36. In addition, registering slots 46 and 47 are provided which extend through the margins 42 and 43 of plates 23 and 24 and communicate with the openings 44 and 45. These slots permit the twine to pass into the various openings 44 and 45 where it may be run along the cutting edges 37 or 38 of the blade 36 and conveniently and rapidly severed. In the drawings, I have shown a cutter constructed with four such openings though it readily can be comprehended that one or any number of such openings as can be conveniently disposed relative to the cutting edges of the cutter may be employed.

The cord 10 by means of which the cutter A is suspended from the spring 11 is attached to the cutter A as follows: The plate 24 and the lug 28 have a bore 48 extending completely through the same, said bore forming an eye through which the twine 20 is threaded. This bore 48 communicates with a bore 48$^a$ in the lug 28, which, in turn, communicates with a groove 49 formed on the inner surface of plate 23, said groove being enlarged at 50 for a purpose presently to appear. The lower end of the cord 10 is threaded into the bore 48 of lug 28 and thence through the bore 48$^a$, a knot 10$^a$ being tied at the extremity of said cord. In assembling the cutter plates 23 and 24, the knot 10$^a$ is lodged in the enlargement 50 of the groove 49 and that portion of the cord next to said knot is lodged in the groove 49 proper, such disposition of the end of the cord providing for a secure and neat connection between the cord 10 and the cutter A. In the construction of the device the lug 29 is preferably so disposed as to lie in near proximity to the center of gravity of the cutter so that the cutter, when suspended, occupies a predetermined fixed angularity which, in most instances, I prefer to have substantially horizontal.

In the use of the device, the cutter A is suspended through the hanger B in a position sufficiently above the working surface 13 of the counter to avoid interference with the work of the user. As the twine 20 is bound around a parcel, it is drawn from the ball 21 through the eye 19 of spring 11 and the eye 48 of the cutter A. After the bundle or parcel is properly bound and the twine tied, the user, without removing his hand from the twine, simply passes his hand along the twine to the cutter A. Grasping the cutter A, it is brought down to the bundle by stretching the spring 11. After guiding that portion of the twine close to the knot into one of the openings 44—45 in the cutter A through a slot 46—47, a slight endwise movement is imparted to the cutter to shift the cutting edge of the blade 36 across the twine and thereby sever the same. Upon releasing the cutter A, the spring 11 draws the cutter up to its normally elevated position carrying with it the trailing extremity of the cord 20, which may be conveniently grasped beneath the cutter A when it is desired to tie the next parcel. Since the cutter A swings with the twine, the user has no difficulty in seizing the cutter when it is desired to sever the twine. By making the cord 10 of proper length the cutter A is always suspended above the working surface at an elevation so as to not be in the way of the user. The buffer rod 11ᵃ within the coil spring 11 controls the rebound of the spring when the cutter A is suddenly released. This control over the spring prevents it from flying up to the ceiling and avoids any undesirable bobbing about of the cutter A after it has been released by the user.

I locate the ball 21 at one side of the hanger B and preferably beneath the eye 19 in spring 11. This relative arrangement of parts prevents the twine 20 from "feeding back" when the cutter A is pulled down toward a bundle on the counter and always insures the presence of a length of twine beneath the cutter of sufficient dimension that the user may conveniently grasp the same.

My invention is highly meritorious in that it provides a simple and effective device for accomplishing the desired results. All of the parts can be constructed at a nominal cost and they function in such manner as to quickly and efficiently produce the results contemplated. The sharp cutting edge of the cutting blade is completely guarded while the portions which engage the twine are readily accessible. The cutter A can be conveniently and easily taken apart and new cutting blades mounted within the same, and in addition the device is so constructed as to utilize cutting blades of standard design.

Changes in the specific form of my invention, as herein disclosed, may be made within the scope of what is claimed without departing from the spirit of my invention.

Having described my invention, what I claim as new and desire to protect by Letters Patent is:

1. A twine guiding and cutting device comprising a resilient member, guiding means for twine attached to said member, a cutter teathered to said resilient member, and means in said cutter for guiding twine therethrough, said cutter being adapted to sever the protruding end of the twine drawn by said cutter.

2. In combination, a resilient depending member adapted to be supported above a working surface, a flexible member secured to the free end of said resilient member and extending downwardly toward said working surface, a twine cutter attached to said flexible member at its lowermost end and normally positioned above said working surface, twine guiding means on the lower end of said resilient member, twine guiding means on said cutter, and means for supporting a ball of twine in position to be drawn through said guiding means, said cutter being adapted to be brought down to said working surface against the action of said resilient member.

3. In combination, a resilient depending member adapted to be supported above a working surface, a flexible member secured to the free end of said resilient member and extending downwardly toward said working surface, a twine cutter attached to said flexible member at its lowermost end and normally positioned above said working surface, twine guiding means on the lower end of said resilient member, twine guiding means on said cutter, and means for supporting a ball of twine in position to be drawn through said guiding means, said cutter being adapted to be brought down to said working surface against the action of said resilient member, and retarding means operating in conjunction with said resilient member for controlling the rebound thereof.

4. A twine dispensing and cutting device comprising a coil spring adapted to be suspended from its upper end and having its lower end free, cord guiding means formed in the free end of said coil spring, a cord attached to the free end of said spring and extending downwardly therefrom, a cutter carried by the cord and cord guiding means formed in said cutter, said cord guiding means being adapted to guide twine along said cord for use at a position below said cutter.

5. A twine dispensing and cutting device comprising a coil spring adapted to be suspended from its upper end and having its lower end free, cord guiding means formed in the free end of said coil spring, a cord attached to the free end of said spring, a cutter secured to said cord, cord guiding means formed in said cutter, said cord guiding means being adapted to feed twine along said cord for use at a position below said cutter, a rod within said spring and a member formed at the lower end of said spring for engagement with said rod to limit the movement of said spring, said member and rod being normally held in engagement through the resiliency of said spring.

6. A cutter comprising a pair of plates, a plurality of lugs formed on one of said plates, the other plate having openings adapted to receive said lugs to hold said plates in registering position with one another, a cutting blade having openings arranged to receive said lugs and adapted to be held thereon between said plates with the cutting edges thereof disposed within the margins of said plates, said plates having registering openings formed adjacent the margins thereof for exposing portions of the cutting edge of said blade and having slots extending through their margins and communicating with said openings to receive twine and conduct it into said openings for engagement with the cutting edge of said blade.

7. A twine cutter comprising a holder having a cutting blade mounted therein, an eye in said holder near the center of gravity thereof for the drawing of twine through said holder and a hanger for supporting said holder attached thereto in proximity to said eye.

8. A twine cutter comprising an elongated holder having a cutting blade mounted therein, means disposed intermediate the ends of said holder for guiding twine to said holder, and a hanger for supporting said holder attached thereto in proximity to the guiding means.

9. A twine cutter comprising a pair of plates, a blade having three holes therein, lugs formed on one of said plates and extending into the holes of said blade for positioning said blade relative to said plate, and an opening through one of said lugs for guiding the cord to be cut through said plate.

10. A twine cutter including a pair of plates, an elongated blade disposed between said plates and having a portion of the cutting edge thereof exposed, said plates extending outwardly beyond said blade at one end thereof to form a handle, said blade having an opening therethrough and an opening through said plates at the opening in said blade for guiding the cord to be cut through said cutter, said handle being reduced in dimensions near the center thereof to bring the center of gravtiy of said cutter at said opening.

11. A twine cutter including a plate, a blade, means for clamping said blade to said plate, said plate having an opening therein, and a cavity formed on the surface thereof facing said plate, and communicating with said opening, and a cord extending through said opening and being knotted within said cavity for suspending said cutter, the knotted end of said cord being held within said cavity by said blade.

In testimony whereof I have affixed my signature to this specification.

JOSEPH E. KROEMER.